(12) United States Patent
Janakiraman et al.

(10) Patent No.: US 9,071,962 B2
(45) Date of Patent: Jun. 30, 2015

(54) EVOLVED PACKET SYSTEM NON ACCESS STRATUM DECIPHERING USING REAL-TIME LTE MONITORING

(71) Applicant: Tektronix, Inc., Plano, TX (US)

(72) Inventors: Vignesh Janakiraman, Plano, TX (US); Antonio Bovo, Padua (IT)

(73) Assignee: Tektronix, Inc., Beaverton, OR (US)

( * ) Notice: Subject to any disclaimer, the term of this patent is extended or adjusted under 35 U.S.C. 154(b) by 292 days.

(21) Appl. No.: 13/901,756

(22) Filed: May 24, 2013

(65) Prior Publication Data

US 2013/0269001 A1 Oct. 10, 2013

Related U.S. Application Data

(62) Division of application No. 12/974,636, filed on Dec. 21, 2010, now abandoned.

(51) Int. Cl.
| | |
|---|---|
| H04L 29/06 | (2006.01) |
| H04W 12/04 | (2009.01) |
| H04L 12/26 | (2006.01) |

(Continued)

(52) U.S. Cl.
CPC .............. *H04W 12/04* (2013.01); *H04L 43/028* (2013.01); *H04L 43/04* (2013.01); *H04L 43/12* (2013.01); *H04L 63/06* (2013.01); *H04W 12/02* (2013.01);

(Continued)

(58) Field of Classification Search
CPC ... H04L 63/061; H04L 63/062; H04L 9/0844; H04L 63/06
See application file for complete search history.

(56) References Cited

U.S. PATENT DOCUMENTS

| | | |
|---|---|---|
| 2006/0262742 A1 | 11/2006 | Dommaraju et al. |
| 2011/0225091 A1* | 9/2011 | Plastina et al. ................. 705/44 |
| 2012/0164979 A1 | 6/2012 | Bachmann et al. |

FOREIGN PATENT DOCUMENTS

| | | |
|---|---|---|
| CN | 101437225 A | 5/2009 |
| EP | 1 699 204 A1 | 9/2006 |

(Continued)

OTHER PUBLICATIONS

Neil Scully, Measurements, Architecture and Interfaces for Self-organising Networks, Oct. 31, 2010, INFSO-ICT-216284 SOCRATES D5.10, 47 pages.*

(Continued)

*Primary Examiner* — Jeffrey Pwu
*Assistant Examiner* — Thong Truong
(74) *Attorney, Agent, or Firm* — Locke Lord LLP; Scott D. Wofsy; Christopher J. Capelli

(57) ABSTRACT

A monitoring system is coupled to interfaces in an LTE network and passively captures packets from the network interfaces. First data packets associated with an authentication and key agreement procedure are captured on a first interface. Second data packets associated with the authentication and key agreement procedure are captured on a second interface. Individual ones of the first data packets are correlated to individual ones of the second data packets based upon a same parameter. An authentication vector table is created comprising information from the correlated first data packets and second data packets, wherein entries in the table comprise authentication data for a plurality of security contexts. A cipher key is identified to decipher additional packets for the user. The cipher key can also be identified in case of Inter Radio Access Technology Handover by the user equipment.

8 Claims, 6 Drawing Sheets

(51) Int. Cl.
    *H04W 12/02*     (2009.01)
    *H04W 24/08*     (2009.01)
    *H04L 9/08*     (2006.01)

(52) U.S. Cl.
    CPC ............. *H04W 24/08* (2013.01); *H04L 9/0844* (2013.01); *H04L 2209/80* (2013.01)

(56) References Cited

FOREIGN PATENT DOCUMENTS

| | | | |
|---|---|---|---|
| EP | 1 976 255 A2 | 10/2008 | |
| JP | 2006279938 A | 10/2006 | |

OTHER PUBLICATIONS

European Patent Office: "Extended European Search Report", EPO Appln No. 11193514.4-2415, Apr. 17, 2012 (7 pages).

3GPP, "Universal Mobile Telecommunications System (UMTS); LTE; 3G security; Security architecture," 3GPP TS 33.102, version 9.3.0 Release 9, Oct. 2010.

3GPP, "Digital cellular telecommunications system (Phase 2+); Universal Mobile Telecommuncations System (UMTS); LTE; 3GPP System Architecture Evolution (SAE); Security architecture," 3GPP TS 33.401, version 9.5.0 Release 9, Oct. 2010.

\* cited by examiner

US 9,071,962 B2

EVOLVED PACKET SYSTEM NON ACCESS STRATUM DECIPHERING USING REAL-TIME LTE MONITORING

TECHNICAL FIELD

Embodiments are directed, in general, to monitoring data packets on an LTE network and, more specifically, to deciphering captured data packets.

BACKGROUND

In a Long Term Evolution (LTE) network, User Equipment (UE) communicates with enhanced Node B (eNodeB) network entities. The eNodeBs are controlled by Mobility Management Entities (MME). When a UE attaches to the LTE, the UE and associated MME undergo an Authentication and Key Agreement (AKA) process, which authenticates the UE and network to each other. The AKA process is used to negotiate keys for ciphering traffic between the UE and the network. When the AKA process is complete, most of the message traffic exchanged between the UE and the network will be ciphered. The ciphered traffic cannot be read unless the receiving party has the same key that the sending party used to cipher the messages.

SUMMARY

Network operators may monitor an LTE network using monitoring equipment that captures and analyzes Packet Data Units (PDUs) from network interfaces. These PDUs may be correlated to create session records on a per user basis. However, the PDUs cannot be correlated if they are ciphered. The monitoring equipment must have the correct keys to decipher the PDUs. A UE attaches to the network and establishes a cipher key with the network. The monitoring system must capture the cipher key or the information used to generate the cipher key when the UE attaches or during subsequent UE activity, or it will be unable to decipher messages associated with the UE.

Embodiments of the monitoring system described and disclosed herein capture and correlate data from multiple network interfaces to

BRIEF DESCRIPTION OF THE DRAWINGS

Figure 1:
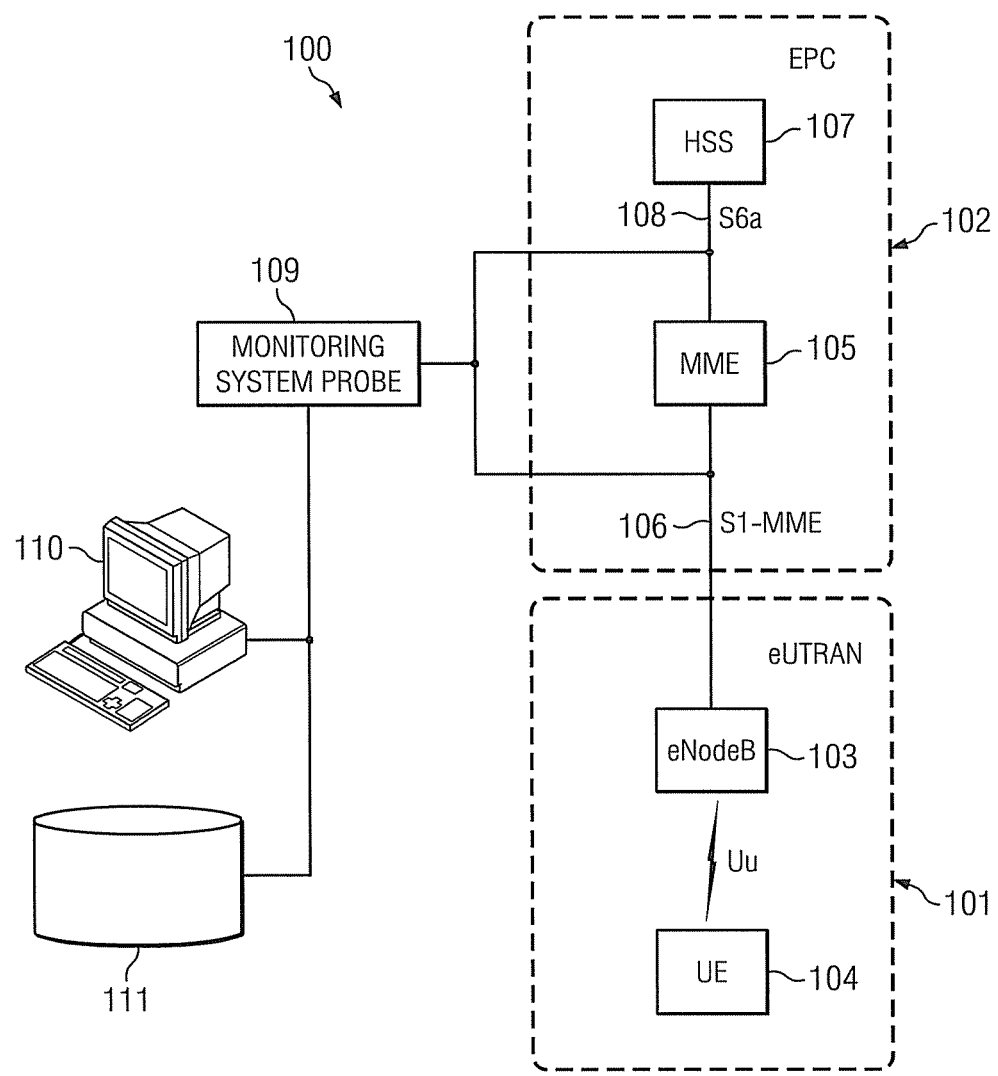
Figure 2:
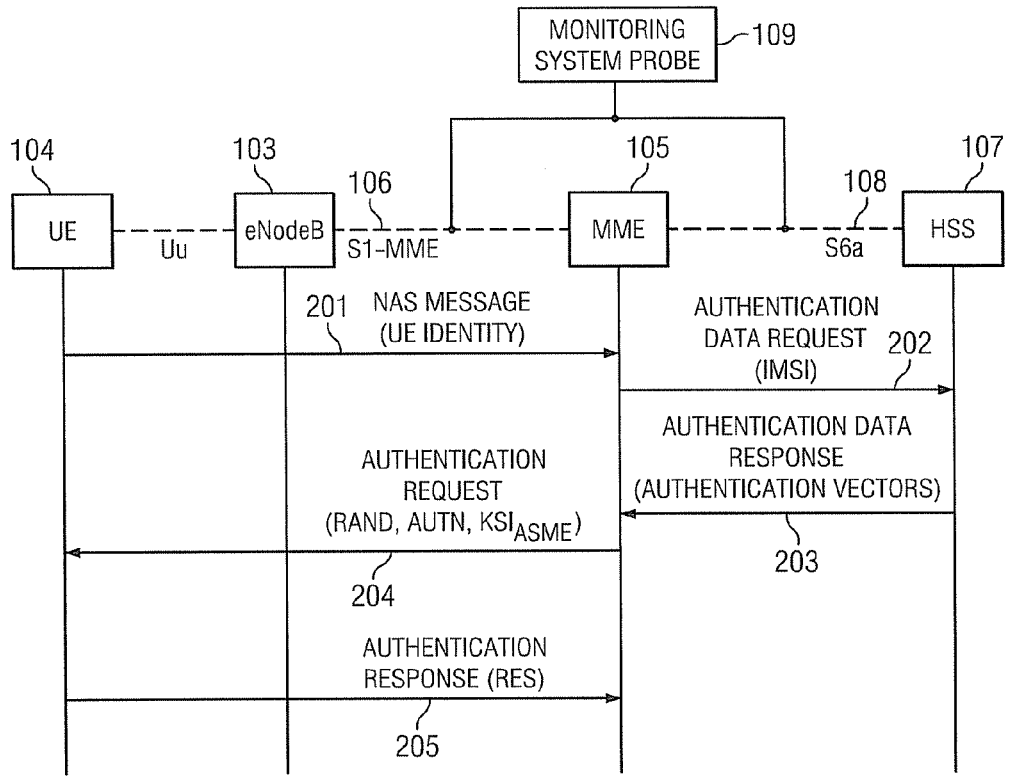
Figure 3:
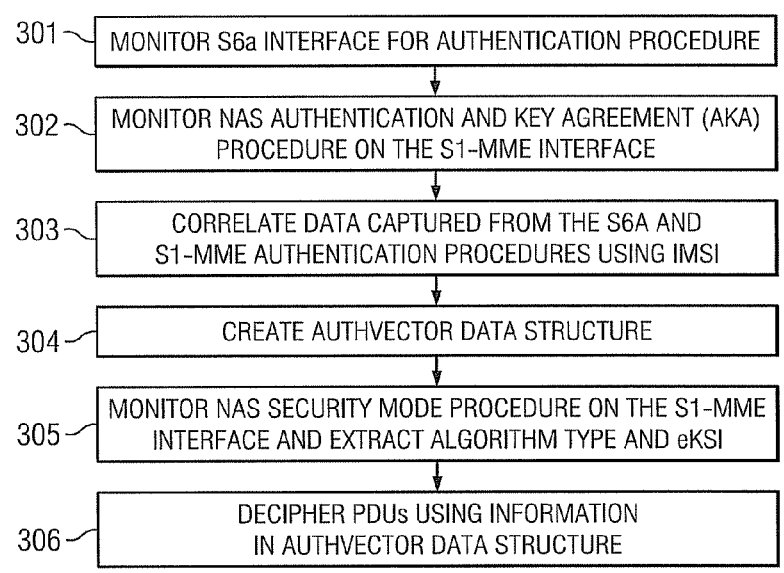
Figure 4:
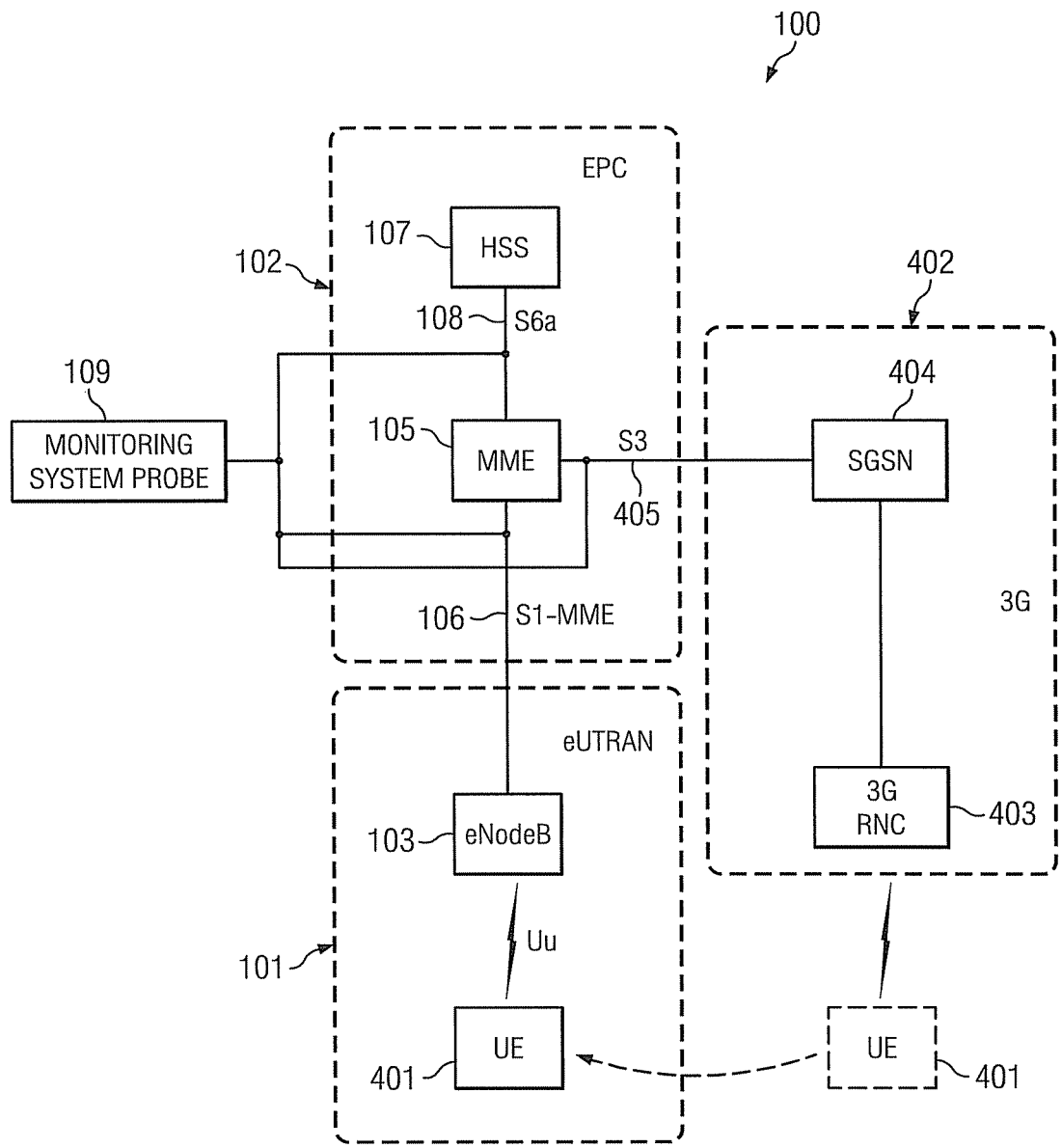
Figure 5:
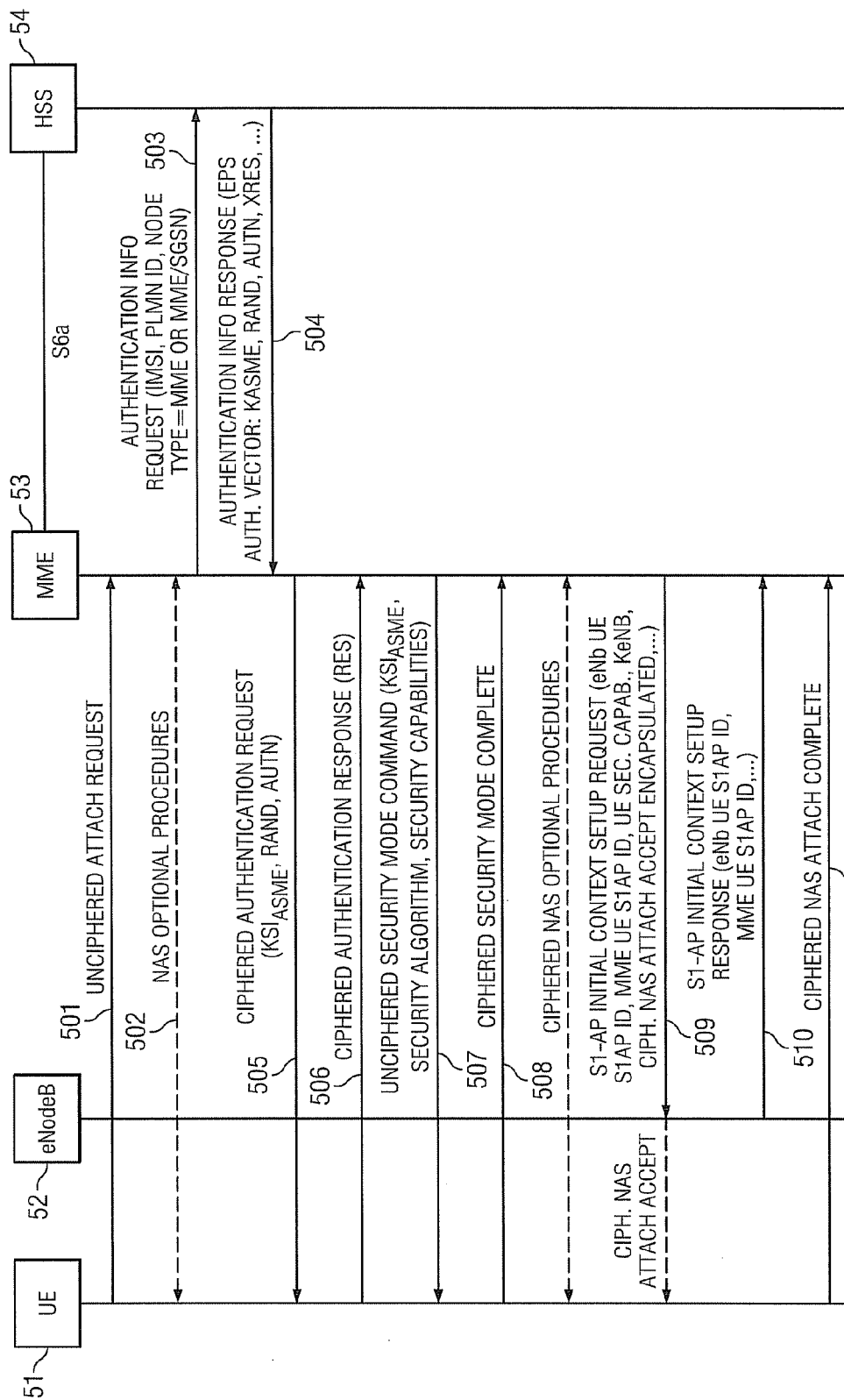
Figure 6:
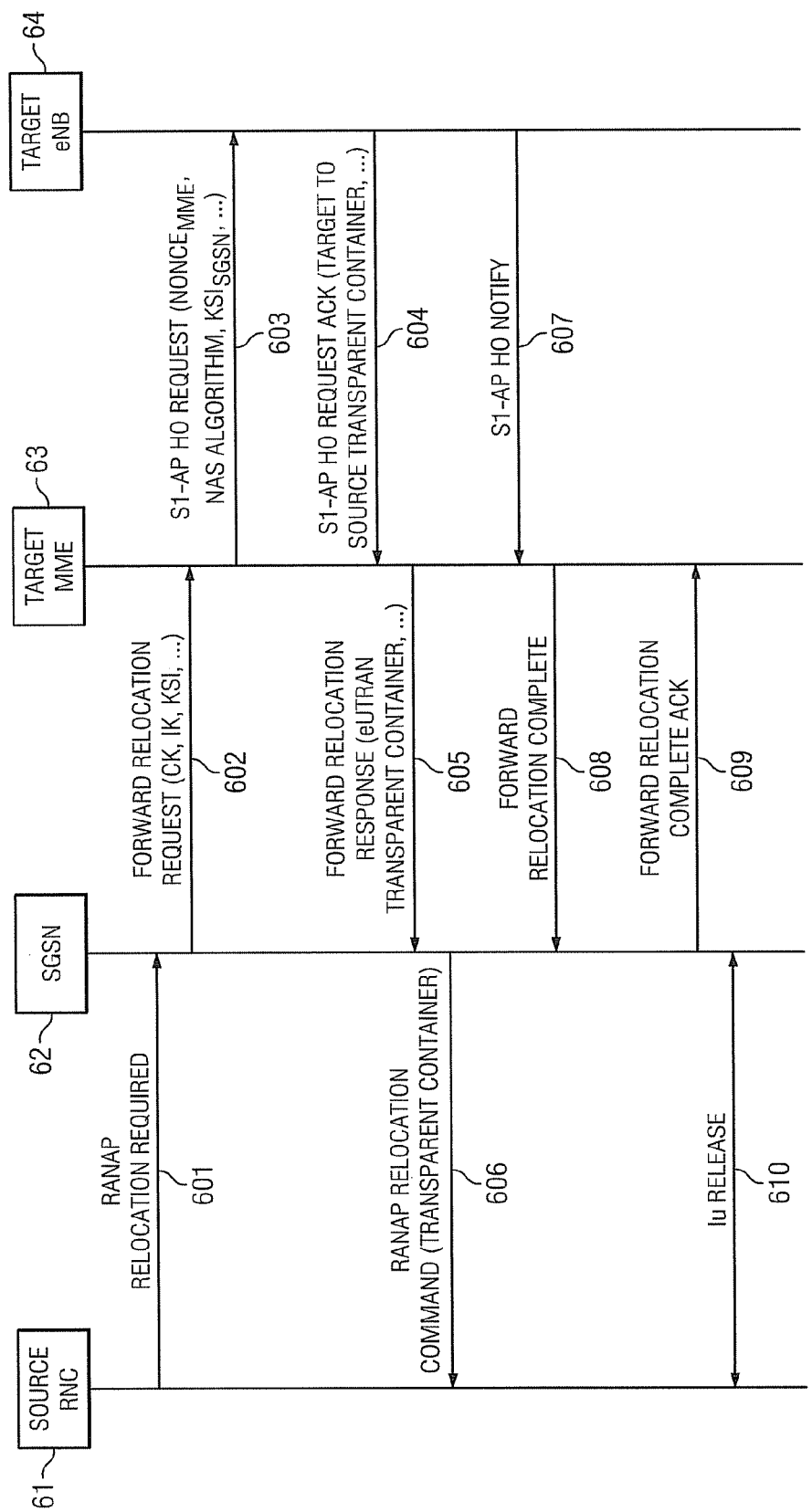
Figure 7:
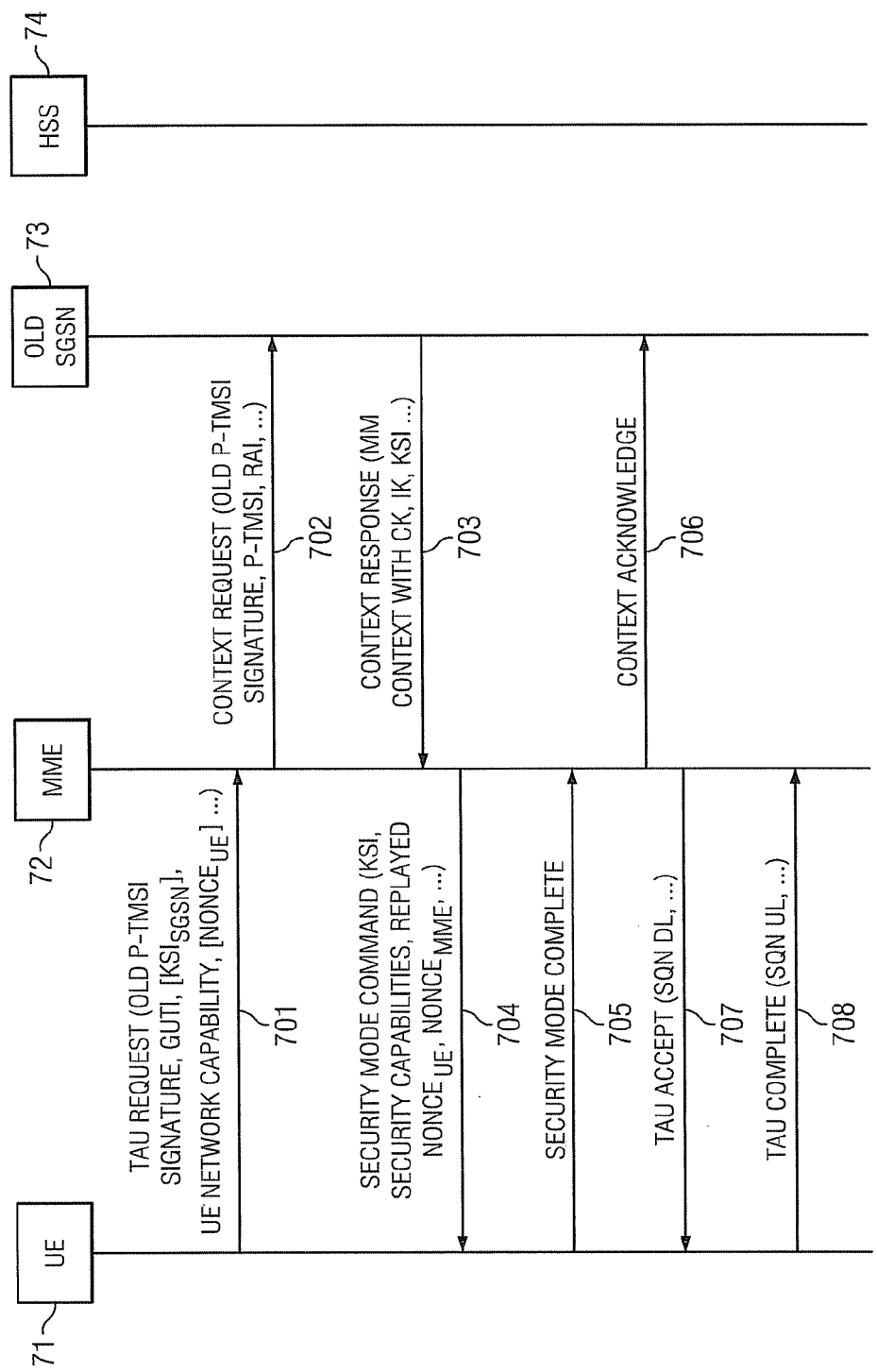

Having thus described the invention in general terms, reference will now be made to the accompanying drawings, wherein:

FIG. 1 is a block diagram illustrating elements of an LTE network;

FIG. 2 illustrates messages exchanged in the Evolved Packet System (EPS) as part of an Authentication and Key Agreement process; and FIG. 3 is a flowchart illustrating a process deciphering packet data units in an EPS NAS;

FIG. 4 is a block diagram illustrating handover of a UE from 3G network to LTE network;

FIG. 5 illustrates an Attach procedure that initially uses an already available key to cipher the NAS traffic after the Authentication procedure a new key is assigned and used;

FIG. 6 illustrates messages exchanged during Inter-RAT handover into eUTRAN; and FIG. 7 illustrates messages exchanged during Idle mode mobility from UTRAN into eUTRAN.

DETAILED DESCRIPTION

The invention now will be described more fully hereinafter with reference to the accompanying drawings. This invention may, however, be embodied in many different forms and should not be construed as limited to the embodiments set forth herein. Rather, these embodiments are provided so that this disclosure will be thorough and complete, and will fully convey the scope of the invention to those skilled in the art. One skilled in the art may be able to use the various embodiments of the invention.

FIG. 1 is a block diagram illustrating elements of a Long Term Evolution (LTE) network 100 and the relationship between certain LTE elements. The elements of an LTE network are well known to those of ordinary skill in the art. It will be understood that for simplicity only a small portion of an LTE network 100 is illustrated in FIG. 1. LTE network 100 comprises two major sections—the evolved UMTS Terrestrial Radio Access Network (eUTRAN) 101 and an all-IP Evolved Packet Core (EPC) 102. EUTRAN 101 and EPC 102 together are referred to as the Evolved Packet System (EPS).

eUTRAN 101 provides the air interface for LTE network 100 using a plurality of enhanced NodeB (eNodeB) base stations 103. The eNodeB 103 interfaces with User Equipment (UE) 104 and hosts the PHYsical (PHY), Medium Access Control (MAC), Radio Link Control (RLC), and Packet Data Convergence Protocol (PDCP) layers. eNodeB 103 also hosts Radio Resource Control (RRC) functionality corresponding to the control plane for radio resource management. eNodeB 103 performs radio resource management, ciphering/deciphering of user and control plane data on the Uu interface, and other functions. eNodeB 103 comprises transceiver components that communicate with User Equipment (UE) 104 over an air interface Uu.

eNodeB 103 can be coupled to one or more Mobility Management Entity (MME) 105 in the EPC via S1-MME interconnections 106. However for a specific UE connection, there is only one MME handling it at time. MME 105 controls the LTE access network and is responsible for UE 104 tracking and paging procedures. MME 105 is responsible for generation and allocation of temporary identities to UE 104 and is part of the bearer activation/deactivation process. MME 105 is also responsible for authenticating UE 104 by interacting with Home Subscriber Service (HSS) 107. MME 105 is linked to HSS 107 via the S6a interface 108. MME 105 is the termination point for ciphering/integrity protection for Non-Access Stratum (NAS) signaling and handles security key management.

When the UE 104 attempts to connect to LTE network 100, eNodeB 103 establishes an S1 Application Part (S1AP) session with MME 105 over S1-MME interconnection 106. The S1AP session provides signaling service between eUTRAN 101 and EPC 102. The NAS signaling transport function of the S1AP session transfers NAS signaling related information between the eNodeB and MME peers. Specific S1AP messages exchanged by the peers allow establishing a "UE Context" both at the MME 105 and at the eNodeB 103 for this S1AP session. MME uses ciphering to ensure confidentiality for NAS signaling messages and provide the eNodeB with the security material to cipher the user data and the signaling on the Uu interface.

The EPS NAS implements security features that provide integrity protection and ciphering of NAS signaling messages. Embodiments of the network monitoring system described and disclosed herein provide a scheme to decipher the EPS NAS signaling messages in real time. EPS NAS deciphering differs from deciphering performed in other networks, such as 3G networks. EPS NAS uses a new key hierarchy and a new key derivation is required to derive $K_{NASenc}$, the basic key used in EPS NAS deciphering, from the $K_{ASME}$ (Access Security Management Entity key). Key caching is used so that UE 104 does not have to renegotiate deciphering keys every time it attaches to network 100. When it attaches to eNodeB 103, UE 104 refers the key $K_{ASME}$ to be used with an index, a key set identifier known as $KSI_{ASME}$ or eKSI. The eKSI (eUTRAN Key Set Identifier) index is a 3-bit index that corresponds to a specific key, which can be either a $KSI_{ASME}$ or a $KSI_{SGSN}$, depending on whether the context is native or mapped. The eKSI is received by the UE during the AKA procedure and can be reused at next attach events to refer the ongoing key. MME 105 may pre-fetch one or more $K_{ASME}$ keys from HSS 107 at a time in anticipation of subsequent new connections from the same UE 104.

The security context states established by EPS need to be tracked for deciphering. The states can be partial/full and current/non-current. In LTE network 100, there are two types of EPS security context, a native security context and a mapped security context. When all security parameters are obtained within the EPS domain, then the security context is referred to as native security context. When the security parameters are obtained by mapping security material in another domain, then the security context is referred to as mapped security content. The mapped security content is used to handle inter-RAT (Radio Access Technology) mobility, such as handover between eUTRAN 101 and a UTRAN (Universal Terrestrial Radio Access Network) or GERAN (GSM EDGE Radio Access Network). Security context mapping minimizes the signaling required to HSS 107.

On the Uu interface between eNodeB 103 and UE 104, it is required to cipher and decipher all user plane packets and to provide confidentiality (optional) and integrity protection for control plane packets. This is done by the UE 104 and the eNodeB 103. In addition to this security mechanism on Uu, there can be an overlapping security confidentiality protection (optional) specific for NAS signaling, in place between the UE 104 and the MME 105. So once eNodeB 103 deciphers the packets/messages on Uu interface, relays the user plane packets on the S1-U interface and relays the ciphered NAS messages on the S1-MME interface. For security confidentiality protection of NAS signaling, it is necessary to obtain security keys for cryptographic protection on the S1-MME interface 106. EPS uses an authentication and key agreement (AKA) procedure to produce such keying material for NAS ciphering keys.

The security architecture, including the security features and the security mechanisms, and the security procedures performed within the EPS, including the EPC and the eUTRAN, are set forth in Technical Specifications produced by the 3rd Generation Partnership Project (3GPP). One Technical Specification of interest is designated "Digital cellular telecommunications system (Phase 2+); Universal Mobile Telecommunications System (UMTS); LTE; 3GPP System Architecture Evolution (SAE); Security architecture (3GPP TS 33.401 version 9.5.0 Release 9)" dated October 2010, and which is incorporated herein by reference in its entirety. Another Technical Specification of interest is designated "Universal Mobile Telecommunications System (UMTS); LTE; 3G security; Security architecture (3GPP TS 33.102 version 9.3.0 Release 9)" dated October 2010, and which is incorporated herein by reference in its entirety.

The EPS NAS security context consists of $K_{ASME}$ with an associated key set identifier eKSI, UE 104 security capabilities, the chosen security algorithms for integrity and ciphering, and the uplink and downlink NAS COUNT values. Separate pairs of NAS COUNT values are used for each EPS NAS security context. The distinction between native and mapped EPS security contexts also applies to EPS NAS security contexts.

FIG. 2 illustrates messages exchanged in the EPS as part of an AKA process. UE 104, eNodeB 103, MME 105 and HSS 107 are interconnected and labeled as shown in FIG. 1. MME 105 is coupled to eNodeB 103 and HSS 107 via S1-MME 106 and S6a 108 interfaces, respectively. The AKA procedure is typically triggered by a NAS message 201 from UE 104 to MME 105 via eNodeB 103. The MME 105 by itself can also trigger an AKA procedure anytime. The NAS message 201 may be, for example, an Attach Request or Service Request message. The initial connection request may occur when the UE 104 is powered-on or changes to an active state. NAS message 201 includes the user identity for UE 104, which is used in the AKA procedure. Upon receiving the connection request from UE 104, MME 105 requests authentication information from HSS 107 in message 202 on S6a interface 108. HSS 107 responds in message 203 with one or more authentication vectors (AV), each one including a random challenge parameter (RAND), expected result parameter (XRES), authentication token (AUTN) and $K_{ASME}$ basic key. The $K_{ASME}$ key is calculated in the HSS/AUC from the CK and IK values. In turn the CK and IK values are calculated using the RAND parameter, such that $CK=f3_K(RAND)$ and $IK=f4_K(RAND)$, where f3 and f4 are key generating functions. So a $K_{ASME}$ value corresponds to a specific RAND value. Each authentication vector is good for one AKA procedure between UE 104 and MME 105. When MME initiates an AKA procedure, it selects the next authentication vector from an ordered array.

Using the authentication vectors, MME 105 will engage the AKA procedure toward UE 104 by sending authentication request message 204, which contains RAND and AUTN parameters. Authentication request message 204 also includes $KSI_{ASME}$, which is used by UE 104 and MME 105 to identify the $K_{ASME}$ and other keys that are further derived from the $K_{ASME}$. The $K_{ASME}$ is derived using a key derivation function (KDF) using the CK, IK and the serving network's identifier (SN id). Using RAND and a shared secret value K, UE 104 authenticates the network by verifying the AUTN parameter from the MME 105. UE 104 then generates and sends a response (RES) value in message 205. MME 105 checks the RES value against the XRES expected value to authenticate UE 104. As a result of the AKA procedure, UE 104 and MME 105 share a $K_{ASME}$ key and they are mutually authenticated.

A monitoring system 109 may be coupled to EPC 102 to passively monitor and collect data from one or more interfaces in the LTE network. Monitoring system 109 may collect user plane and control plane data from the EPC interfaces, including the S1-MME 106 and S6a 108 interfaces. Monitoring system 109 may comprise, in one embodiment, one or more processors running one or more software applications that collect, correlate and analyze Protocol Data Units (PDU) from network 100. Monitoring system 109 may incorporate protocol analyzer, session analyzer, and/or traffic analyzer functionality that provides OSI (Open Systems Interconnection) layer 2 to layer 7 troubleshooting by characterizing IP traffic by links, nodes, applications and servers on network 100. Such functionality is provided, for example, by the GeoProbe G10 platform, including the Iris Analyzer Toolset applications and SpIprobes, from Tektronix Incorporated.

Monitoring system 109 may be coupling to network interfaces via packet capture devices, such as high-speed, high-density probes that are optimized to handle high bandwidth IP traffic. Monitoring system 109 passively captures message traffic from the interfaces without interrupting the network's operation. A service provider or network operator may access data from monitoring system 109 via user interface station 110. Monitoring system 109 may further comprise internal or external memory 111 for storing captured data packets, user session data, call records configuration information, and software application instructions. Monitoring system 109 may capture and correlate the packets associated specific data sessions on network interfaces. In one embodiment, related packets can be correlated using a 5-tuple association mechanism. The 5-tuple association process uses an IP correlation key that consists of 5 parts—server IP address, client IP address, source port, destination port, and Layer 7 Protocol (HTTP, DNS, GTPv2 or S1AP). The related packets can be combined into a record for a particular flow, session or call on network 100.

The monitoring system probes may comprise passive probes that tap into the connections or interfaces using an optical or electrical splitter to mirror the data that is flowing between the network equipment without affecting the main data link. The captured data may be filtered, groomed and/or passed to a data acquisition processor, function or circuit in the monitoring system that analyzes the content of the captured data, such as identifying individual messages and parameters within the messages.

In an alternative embodiment, monitoring system 109 may be an active component (e.g. software agent) that resides on an EPC node, such as on MME 103, for example, and that captures data packets passing into or out of the node.

Traffic on the S1-MME interface 106 may be unciphered and available for use by monitoring system 109 to correlate with related traffic to create session records. However, the traffic on S1-MME is often ciphered. Without the appropriate cipher keys to decrypt the messages, the traffic cannot be used by monitoring system 110.

FIG. 3 is a flowchart illustrating a process for performing EPS NAS deciphering in a monitoring system. In step 301, the monitoring system monitors the S6a interface between an MME and an HSS for traffic associated with an authentication procedure. The parameters exchanged on the S6a interface are unciphered. The purpose of the authentication procedure is to provide the MME with one or more authentication vectors, such as RAND, AUTN, XRES, and $K_{ASME}$, to authenticate the UE and provide the security material. Each authentication vector can be used to authenticate the UE. If more than one authentication vector is fetched by the MME, the excess vectors are used during subsequent AKA procedures for that UE. The IMSI (International Mobile Subscriber Identity) is the permanent identity of the UE and it is included in the S6a "Authentication Information Request" message, while the authentication vectors are mandatory in the S6a "Authentication Information Response" message, if successful. The IMSI, RAND, AUTN, and $K_{ASME}$ parameters may be extracted from the authentication procedure on S6a.

In step 302, the monitoring system monitors the NAS Authentication and Key Agreement (AKA) Procedure over the S1-MME interface. The purpose of the AKA procedure is for the MME to authenticate the UE and to mutually agree with the UE on a $K_{ASME}$ key without actually transmitting the key on the S1-MME interface. An EPS security context is established in the UE and in the network when an EPS authentication is successfully performed.

The Authentication Request message carries the RAND, AUTN and eKSI. So these values can be extracted from the authentication procedure messages. The Authentication Response message from the UE carries the RES, which is used by the MME to determine if the authentication was successful or not. If the RES value sent by the UE is incorrect (i.e. RES does not equal XRES), then the MME sends an Authentication Reject message back to the UE.

It is assumed that the UE initially attaches using an IMSI in the S1AP initial UE message. The monitoring system may extract the IMSI and can then correlate the IMSI with the RAND, AUTN, and eKSI parameters. It is also assumed that the Authentication Request message will be unciphered the first time the UE attaches to the network.

The eKSI is the NAS key set identifier. eKSI has values 0-7 and is used to identify the derived $K_{ASME}$ key in future transactions. This enables the capability of a cached security context. For example, assume that the UE is authenticated and a secure NAS connection has been established. When the UE transitions to EMM-Idle state and later resumes back to EMM-Connected state with a Service Request procedure, the UE will include the eKSI. If the eKSI and authentication parameters were previously captured for the UE, then the monitoring system can map the eKSI to a cached security context and can begin deciphering captured NAS messages. If the MME initiates the AKA procedure, then a new security context will be established with a new eKSI.

In step 303, the monitoring system correlates between the Authentication procedures on S6a and S1-MME. The monitoring system uses the IMSI, for example, to correlate the data captured from the authentication procedures on the S1-MME and S6a interfaces. The monitoring system creates a data structure, referred to herein as an EPS AuthVector, in step 304. The AuthVector data structure contains the eKSI, RAND, AUTN, algorithm type and $K_{ASME}$ parameters. The algorithm type may be identified from the Security Mode Command message that is sent from the MME to the UE. If prefetched vectors are detected and captured, they are stored in an AuthVector data structure without a eKSI since it has not yet been assigned. The AuthVector data is a combination of the data from both the S6a and S1-MME legs of the authentication procedure at a per-user level.

In step 305, the monitoring system monitors the NAS security mode procedure on the S1-MME interface. The purpose of the NAS security mode control procedure is to put an EPS security context into use and to initialize NAS signaling security between the UE and the MME using the corresponding NAS keys and security algorithms. The MME sends an unciphered Security Mode Command message to the UE. The monitoring system captures this message and extracts the algorithm type and eKSI parameters. The eKSI value is then used to determine if the security context is native or mapped and to retrieve the $K_{ASME}$ (native security context) or $K'_{ASME}$ (mapped security context) associated with that context. The monitoring system identifies the appropriate AuthVector data structure and uses the information therein for deciphering messages captured for that security context or that particular NAS channel.

After the Security Mode Procedure is complete, all of the PDUs for the UE will be ciphered. In step 306, the monitoring system deciphers PDUs using information from the AuthVector data structure. When a NAS PDU is captured, the monitoring system use header information to identify the AuthVector data structure associated with the PDU. The monitoring system may use a fast key access cache to provide efficiency in deciphering PDUs since the operation must be performed for every PDU.

The monitoring system provides the following parameters to the deciphering algorithm: $K_{NASenc}$, NAS COUNT, Bearer, Direction, and Algorithm Type. $K_{NASenc}$, which is derived from $K_{ASME}$ and stored with the EPS AuthVector data structure. NAS COUNT pair, where each value is a 32-bit COUNT parameter. The format of the NAS COUNT is shown in TABLE 1.

TABLE 1

| 8 Bits | 16 Bits | 8 Bits |
|---|---|---|
| Padding (0x00) | Overflow Number (ON) | Sequence Number (SN) |

The NAS COUNT is maintained per direction (Uplink and Downlink) by the monitoring system. The NAS COUNTs are reset in both directions on every Security Mode Command message after a successful AKA run. The SN is extracted from each NAS message. The ON is maintained by the monitoring system by starting at "0" and incrementing by "1" every time the SN wraps around.

Bearer is a 5-bit bearer identifier, which is always set to "0" for NAS.

Direction of the transmission, which is indicated as "0" for Uplink, and "1" for Downlink. The direction of the message can be assigned using the S1AP message type. All UE related S1AP signaling messages are uni-directional. Using this fact, the Uplink or Downlink direction can be assigned to each PDU. The monitoring system can decipher PDUs captured from traffic in either direction.

Algorithm Type, which is stored in the EPS AuthVector data structure. EPS NAS uses publicly available SNOW3G and AES algorithms.

The UE is assigned an IMSI and a GUTI (Globally Unique Temporary Identity). To build a subscriber record and to track an S1AP call, the monitoring system uses an eNodeB-UE identifier along with the IMSI/GUTI information that is present in the S1AP signaling. When the S1AP call is released, the eNodeB-UE ID is removed, but the IMSI/GUTI is maintained in the database. When the UE again attaches to the network, a new S1AP session with a new eNodeB-UE ID is established. The new session can be correlated back to the same Subscriber Record using the IMSI/GUTI.

When the UE reattaches to the network, it may not perform a new AKA procedure with the MME. Instead, the UE can send an eKSI that it previously used to continue ciphering packets using the previously established parameters. Using the S1AP call tracking method to identify the subscriber record, such as by indexing the records using IMSI/GUTI, the AuthVector for the UE can be retrieved by the monitoring system. This allows the monitoring system to resume deciphering packets for that UE.

Embodiments of the present invention allow the monitoring system to decipher PDUs even when the UE does not perform an AKA procedure with the MME. For example, when the UE first attaches, keys and authentication data can be captured by the monitoring system from the S6a interface. This information can be used to decipher corresponding PDUs on the S1-MME interface. If the UE detaches and later attaches a second time, the MME and UE do not need to execute the AKA procedure again or to exchange key information on the S1-MME or S6a interfaces. Both the UE and MME use key caching to track the keys they previously used. These keys can be used when the UE attaches again. Accordingly, the monitoring signal will not see the AKA procedure or related data on the S1-MME or S6a interfaces. Instead, the UE and MAC may begin exchanging ciphered data immediately. The monitoring system can use the IMSI/GUTI information to identify an existing subscriber record for the UE. Additionally, the UE will transmit an eKSI value in a Service Request message or optionally in the Attach Request/TAU Request message. The MME can use the eKSI value to refer back to an existing $K_{AMSE}$ and can send ciphered data immediately. The key information stored in the subscriber record may be used to decipher the traffic for the second attachment.

The above algorithm assumes that an unciphered Authentication Request is monitored. Once the monitoring system sees an unciphered Authentication Request message, it has enough data to generate the keys necessary to decipher the rest of the messages from the UE. However, in some instances all Authentication Request messages may be ciphered. The monitoring system will still be able to identify the security keys for the UE. The monitoring system captures the $K_{eNB}$ parameter sent in the Initial Context Setup message on the S1-MME interface. The monitoring system may also get the $K_{ASME}$ from the S6a interface. The monitoring system can derive the $K_{eNB}$ from the $K_{ASME}$. Accordingly, when the monitoring system generates the $K_{ASME}$, it can also generate a corresponding $K_{eNB}$ and store it in the AuthVector or Subscriber Record. When the $K_{eNB}$ is captured in the "Initial Context Setup" or "UE Context Modification" messages, the monitoring system can identify the associated $K_{ASME}$ that is needed for deciphering.

When the keys are generated using the AKA procedure based upon data exchanged with the HSS, the security context is referred to as "native." When keys are received by the MME from another network, such as a 3G or 2G network, then the security context is referred to as "mapped." FIG. 4 is a block diagram illustrating handover of UE 401 from 3G network 402 to LTE network 100. UE 401 is initially in communication with 3G RNC 403 and is being handed over to eNodeB 103. SGSN 404 in the 3G network is coupled to the 3G RNC 403 and to MME 105 in the LTE network. As part of the handover process, SGSN 404 and MME 105 exchange information associated with UE 401, including the CK, IK and IMSI parameters, across S3 interface 405. The handed-over UE 401 has a mapped security context. LTE network 100 creates a $K'_{ASME}$ for the mapped security context for use in ciphering/deciphering traffic for UE 401. In one embodiment, the monitoring system 109 may also be coupled to the S3 interface 405 and may capture PDUs associated with the handover UE 401, such as the CK, IK and IMSI data. This captured data allows monitoring system 109 to derive the keys for UE 401 so that other captured traffic may also be deciphered. A similar concept can be applied also in case of Idle mode mobility from UTRAN/GERAN to eUTRAN.

In some embodiment, MME 105 may pre-fetch keys for use in the native security context. MME 105 retrieves data for the next key that will be used from HSS 107. This allows MME 105 to immediately perform the AKA procedure the next time the UE attaches without waiting to obtain key data from HSS 107. As a result, the key data in this situation will pass across the S6a interface before the authentication process begins. Monitoring probe 109 will capture the pre-fetched key data from S6a and store the $K_{ASME}$ for the pre-fetched keys until it is needed by the MME 105. When the same UE re-attaches and MME 105 begins the AKA procedure, monitoring system 109 will already have the security keys that will be used. The monitoring system 109 can then use the $K_{ASME}$ to decipher PDUs associated with the UE.

When a UE connects to a LTE network, the eNodeB establishes a Stream Control Transmission Protocol (SCTP) transport session to the MME. The S1 Application Protocol (S1AP) is used by the eNodeB to communicate with the MME. One of the main functions of S1AP is the UE Context Management function, which supports user individual signaling on S1. The EPS NAS signaling is transparently carried on top of S1AP to the MME from the UE without eNodeB interpretation.

When the UE does an initial Attach Procedure with the MME, the UE sends its permanent subscriber identity (IMSI). The MME identifies the UE and validates the service that needs to be provided using the IMSI. Once the MME has done this initial validation, it assigns a temporary identity (GUTI) to the UE. From that point onwards, the UE sends the GUTI—not the IMSI—to the MME for subsequent service requests, including Attaches. LTE employs this mechanism primarily as a security feature to prevent the IMSI value from being captured from the messages.

This poses a challenge to the monitoring system, which might not have been in service when the UE performed an Initial Attach. The UE may not send the IMSI to the MME again for days or even months. So, if the monitoring system relied only on detecting the presence of IMSI in S1AP signaling, the success rate of identifying each S1AP signaling session to a UE would be remote, which drastically undermines the value of the monitoring system.

Embodiments of the monitoring system disclosed herein provide a scheme in which all UE-associated S1AP signaling can be identified with an IMSI even if the IMSI is not present in the S1AP signaling. The monitoring system can correlate the IMSI to S1AP signaling by correlating the S1AP/NAS Authentication Procedure with the S6a Diameter Authentication Procedure.

The S1AP Authentication procedure is performed frequently by the MME to authenticate the UE. However, before it can do this procedure, the MME must fetch EPS Authentication vectors for the UE from the HSS in an S6a Authentication. Three parameters of the EPS Authentication vector (RAND, AUTN and XRES), which are fetched in the S6a Authentication procedure, are also carried by messages in the S1AP/NAS Authentication procedure. The RAND+AUTN parameters are sent by the MME to the UE, and then the UE responds back to the MME with the XRES. Accordingly, using these three parameters (RAND, AUTN and XRES) of the EPS Authentication vectors, it is possible to correlate the S1AP Authentication Procedure with the S6a Authentication Procedure.

In the S6a Authentication Request, the IMSI is a mandatory parameter that has to be sent by the MME to the HSS to request the EPS Authentication vectors. Since the IMSI is mandatory in the S6a Authentication procedure, and the S6A Authentication procedure can be correlated with the S1AP Authentication procedure, the IMSI can also be correlated to the UE's S1AP signaling connection. The temporary identity, GUTI, which has been assigned by the MME, may also be mapped to the IMSI in this process. Any subsequent Attaches by the UE that use the GUTI parameter can be immediately mapped to identify the UE's IMSI. GUTI changes are tracked from the S1AP signaling procedures, such as the S1AP GUTI Reallocation message, S1AP Tracking Area Update (TAU) message, and S1AP Attach message. This allows the monitoring system to keep the GUTI-IMSI mapping current. Having this permanent subscriber tracking mechanism allows the monitoring system applications to track by IMSI. Some of these applications are the Call Tracer, Call Data Records, Multi Protocol Correlation with S11, S6a interfaces.

When the NAS authentication procedure is ciphered on S1-MME, a correlation algorithm using the $K_{eNB}$ key can bind the $K_{ASME}$ monitored on the S6a interface with the S1AP context and with the IMSI. The general algorithm described above can be used in the other scenarios when the NAS authentication procedure is unciphered.

FIG. 5 illustrates an Attach procedure that uses an already available key to cipher the NAS traffic at first. After an AKA procedure, a new $K_{ASME}$ is assigned and used. An Attach Request message 501 is sent from UE 51 to MME 53 via eNodeB 52. Additional, optional NAS procedures 502 associated with Identity requests and responses may occur after the Attach Request message 501. MME 54 can decide to retrieve a new set of EPS authentication vectors from HSS 54 an S6a interface in messages 503 and 504. The 3GPP TS 33.401 specification, cited above, recommends fetching only one EPS authentication vector at time. The Authentication Info Request 503 and Authentication Info Response 504 messages are not ciphered.

MME 53 initiates a new AKA procedure 505, 506 on S1AP/NAS to change the key that is being used. The AKA messages 505 and 506 are ciphered. Therefore, it is not possible to apply the standard algorithm that binds the RAND value between S1AP/NAS message 505 and S6a message 504 to identify the $K_{ASME}$ key that will be used following the AKA procedure.

MME 53 sends an unciphered Security Mode Command message 507 to UE 51. UE 51 responds back with a Security Mode Complete message 508, which is ciphered using the new EPS security context. MME 53 then sends eNodeB 52 an S1AP Initial Context Setup Request message 509 to establish the S1AP context. The S1AP Context Setup Request message 509 includes the $K_{eNB}$ key to be used from now on to derive relevant Uu interface security keys to be applied at the radio level. The context setup is completed with response message 510, and the NAS attach procedure is completed with message 511. In another message flow scenario, an S1AP UE Context Modification Request message is involved in $K_{eNB}$ assignment when there is a UE context modification.

The issue raised by the procedure outlined in FIG. 5 is how to identify the $K_{ASME}$ to be used if the NAS authentication procedure is ciphered. A $K_{eNB}$ correlation algorithm can be used to solve this issue. A network monitoring system can monitor the S6a interface to get the $K_{ASME}$ and the IMSI from authentication procedure message 503, 504. The $K_{ASME}$ keys monitored on the S6a interface can be stored and indexed by an associated IMSI. $K_{ASME}$ keys that are pre-fetched by the MME can also be stored and indexed in this way.

The $K_{eNB}$ key is calculated using the KDF function, which has as inputs the fresh $K_{ASME}$ and the NAS uplink count. In the example illustrated in FIG. 5, UE 51 sets the NAS uplink count to the start value (=0) after the successful AKA run. UE 51 also includes the sequence number part of the NAS uplink count in the NAS Security Mode Complete message 508. This assures that also the overflow parameter is reset to 0.

The $K_{eNb}$ correlation algorithm derives $K_{eNB}$ from every $K_{ASME}$ that is identified on the S6a interface and indexes it using the $K_{eNB}$ value itself. The $K_{eNB}$ and $K_{ASME}$ keys may be stored in an AuthVector or Subscriber Record as described above, for example. The $K_{eNB}$ values that are calculated by the correlation algorithm using the $K_{ASME}$ may be designated as "$K^{alg}_{eNB}$". The algorithm processes both the monitored $K_{ASME}$ values and the NAS uplink count value with the KDF function to obtain the $K^{alg}_{eNB}$ candidates.

As soon as the monitoring system detects the S1AP Initial context Setup request message 509 (or the UE Context modification request message in an alternative embodiment), the monitoring system retrieves the $K_{eNB}$ value included in message 509 and does a reverse lookup of the stored $K_{eNB}$ values to identify the $K_{ASME}$ that is in use. The monitoring system determines if any of the $K^{alg}_{eNB}$ candidates (i.e. $K_{eNB}$ values calculated from the $K_{ASME}$ on the S6a interface) are equal to the $K_{eNB}$ monitored at S1AP level. If a match is found, then the KASME corresponding to the $K^{alg}_{eNB}$ will be used. From this $K_{ASME}$, the monitoring system can derive the $NAS_{enc}$ key for NAS deciphering.

In one embodiment, ciphered NAS PDUs are buffered or stored by the monitoring system until an Initial Context Setup request message 509 (or UE Context modification request message) is detected. Once the $K_{ASME}$ has been identified, the stored PDUs in the buffer can be deciphered.

The processing load required by the monitoring system to calculate and index a $K^{alg}_{eNB}$ value for every $K_{ASME}$ detected may be prohibitive. To limit the processing load, the monitoring system may use an optimized $K_{eNB}$ correlation algorithm. The concept of the optimized algorithm is similar to the core algorithm described above; however, instead of processing and indexing every $K_{ASME}$ and $K^{alg}_{eNB}$, the process is limited to $K_{ASME}$ values corresponding to those IMSI for which no key has been determined yet.

The optimized algorithm operates as follows. The monitoring system captures data from the S11 interface (i.e. the GTPv2-C protocol) in addition to monitoring the S1-MME and S6a interfaces. The related S11-S6a-S1AP legs are bound together. One consequence of this binding is the ability to correlate the IMSI with the specific S1AP connection if the S1AP and/or the piggybacked NAS in clear text have temporary identifiers (e.g. either GUTI or S-TMSI) only and no IMSI for the UE. The S6a authentication procedure is monitored and the $K_{ASME}$ values are stored in the monitoring system memory and indexed by IMSI.

When an S1AP Initial Context Setup request message (or UE Context modification request message) is detected, the IMSI involved is known (via the S11 binding) and so the monitoring system can determine if the $K_{ASME}$ has been already identified for that UE or not based on the IMSI. If the $K_{ASME}$ is already available for that IMSI, then the algorithm can skip the remaining steps in the correlation process. Otherwise, if the $K_{ASME}$ is not known for the IMSI, then the optimized algorithm retrieves the stored $K_{ASME}$ keys with a lookup by IMSI, and then derives the $K^{alg}_{eNB}$ values from the retrieved $K_{ASME}$ keys. Finally, the monitoring system tries to match the $K_{eNB}$ value monitored in an S1AP Initial Context Setup request message (or UE Context modification request message) with the calculated $K^{alg}_{eNB}$ values. If a match is found, then the monitoring system has identified the $K_{ASME}$ to use.

To establish the S11 and S1AP binding, the monitoring system uses the following process. For S11 monitoring, session information from the Create Session procedure is captured, including the IMSI, MSISDN, CP tunnel TEIDs sender and receiver, S1-U TEIDs sender and receiver parameters. The S1-U S-GW F-TEID parameter, which is for the identification of the tunnel ID of S1-U at the S-GW side, is present in the S11 GTPv2-C Create Session Response message and on the S1AP Initial Context Setup Request message. The monitoring system binds the IMSI from the GTPv2-C to the S1-MME UE context using the S1-U S-GW F-TEID parameter.

Similarly, by binding the S1-U eNodeB F-TEID parameter, which is for the identification of the tunnel ID of S1-U at eNodeB side, from the S11 GTPv2-C Modify Bearer Request message to the S1AP Initial Context Setup Response, also provides the IMSI mapping.

The security parameters needed for NAS ciphering/deciphering are part of an EPS NAS security context. These parameters include:
the $K_{ASME}$ key;
the $K_{NASint}$ key and the $K_{NASenc}$ keys;
the eKSI index;
the UE security capabilities, such as the type of algorithms supported for integrity and ciphering;
the uplink (UL) and downlink (DL) $NAS_{COUNT}$ values; and
authentication digests and EPS challenge values, such as RAND.

These security parameters can be obtained in two different ways. They can be retrieved in the EPS environment, such as querying the HSS via S6a or obtaining them from another MME in case of inter-MME mobility. This is the native security context for which the security parameters are the $K_{ASME}$ key, RAND, AUTN, and XRES that together form an EPS authentication vector. Alternatively, the parameters can be mapped from UTRAN/GERAN security parameters, in case of inter-RAT mobility. This is the mapped security context.

The native EPS NAS security context is described above for the basic NAS deciphering scenario. In the mapped security context, the procedure to obtain the security parameters is different from the native context because the information is mapped from the UTRAN/GERAN security material. Using this mapping minimizes the signaling required to the HSS.

In the mapping context, the concept of indexing the keys is still the same as used in the native context. The index used in the mapped case is the $KSI_{SGSN}$, which refers to a specific key mapped from the UTRAN/GERAN.

The UE and the network can store both a native security context and a mapped security context concurrently, but only one of them is active at one time. This means that the monitoring system must maintain both the native and the mapped security context information for a specific UE. When the UE state transitions to an EMM-DEREGISTERED state, if there is a non-current native EPS security context and a current mapped security context, the non-current native EPS security context is marked as current and the mapped security contexts are deleted.

Handover or idle mode mobility from a UTRAN/GERAN network to the eUTRAN can affect the monitoring system's ability to decipher data on the LTE network. To monitor traffic for a UE that moves from a UTRAN/GERAN to a eUTRAN, the monitoring system must use data from a mapped EPS security context. The MME that handles the UE from a UTRAN/GERAN gets CK and IK values from a SGSN via GTPv2-C messages. The MME then derives a new $K_{ASME}$ from these sub-keys using the KDF derivation function and one or two nonces as inputs. The number of nonces required depends on whether the UE has moved due to idle mode mobility or handover. The nonces are communicated via the initial NAS messages between the UE and the MME. The formula for calculating the $K'_{ASME}$ is shown in Equation 1.

$$K'_{ASME}=HMAC\text{-}SHA\text{-}256(CK\|IK,S) \qquad \text{Eq. 1}$$

The "S" parameter must be obtained during a handover or idle mode mobility into eUTRAN. The value of S, in case of handover, is defined as:

$$S=FC\|PO\|LO \qquad \text{Eq. 2}$$

where:
FC=0x18;
PO=$NONCE_{MME}$;
LO=length of the $NONCE_{MME}$ parameter in two octets coding=0x00 0x04; and
$\|$ bit concatenation operator.

FIG. 6 illustrates messages exchanged during Inter-RAT handover into eUTRAN. The Source RNC sends a RANAP Relocation Required message 601 to the source SGSN 62. Once it has identified target MME 63, the SGSN 62 sends a GTPv2-C Forward Relocation Request message 602 to the MME 63. Message 602 includes the current security material—CK, IK and KSI—that is available in the UTRAN environment. MME 63 selects a $NONCE_{MME}$ and sends S1AP HO Request message 603 to the Target eNB 64 to establish a UE context. Message 603 includes the $NONCE_{MME}$ and also the type of algorithm and the index $KSI_{SGSN}$.

The UE also needs the NONCE$_{MME}$ value and the other parameters. A Target to Source Transparent Container is created to carry these parameters and others. The Container is included in the S1AP HO Request Ack message 604, the GTPv2-C Forward Relocation Response message 605, and the RANAP Relocation Command message 606. The UTRAN RNC then provides this information to the UE. Once the handover is complete, S1AP HO Notify message 607 is sent to the target MME 63, which in turn exchanges Forward Relocation Complete messages 608, 609 to close the procedure with the source SGSN 62. The SGSN 62 then releases the resources on the Iu interface.

The parameters needed to calculate the K'$_{ASME}$ key, which is required for deciphering messages, can be obtained by a monitoring system from the GTPv2-C Forward Relocation Request message 602 and the S1AP Handover Request message 604. The GTPv2-C message contains the subkeys CK, IK and the index KSI. The S1AP message includes the index again, the NAS algorithm to be applied and the NONCE$_{MME}$. The index is used to refer to the mapped context, and the parameters NONCE$_{MME}$, CK and IK can be used to obtain the new key. The monitoring system can calculate the K'$_{ASME}$ key needed to decipher traffic for the associated UE.

FIG. 7 illustrates messages exchanged during Idle mode mobility from UTRAN into eUTRAN, where the UE does not have any current or native EPS security context already. The illustrated scenario describes the usage of a mapped security context in idle mode.

UE 71 sends a TAU Request message 701 to new MME 72. UE 71 was previously connected to UTRAN SGSN 73. TAU Request message 701 includes an old P-TMSI signature to signal that it is an inter-RAT scenario. The message also includes the KSI$_{ASME}$ with the value "no key available," the K$_{SGSN}$, the UE's security capabilities, which may be a list of supported algorithms, and the NONCE$_{UE}$, which is useful to calculate the new keys.

MME 72 queries the old SGSN 73 using a GTPv2-C Context Request message 702 to retrieve an MM context. The response 703 from old SGSN 73 includes the mapped security context parameters CK, IK and KSI. These parameters correspond to the KSI$_{SGSN}$ value present in the TAU request 701.

MME 72 then sends Security Mode Command message 704 to UE 71. Message 704 comprises the following parameters: the KSI value, which is marked as a "mapped" KSI=KSI$_{SGSN}$, the algorithm chosen, the NONCE$_{UE}$ sent in the TAU request, and the NONCE$_{MME}$ chosen by the MME. The NONCEs parameters are the input values to the hash function for obtaining the new K'$_{ASME}$, which is not transferred in the clear on the interfaces. NONCE$_{UE}$ is a 32-bit nonce value chosen by the UE 71 and transferred to the MME 72 via the NAS Tracking Area Request message 701. NONCE$_{MME}$ is a 32-bit nonce value chosen by the MME 72 and transferred to the UE 71 via the NAS Security Mode Command message 704.

The Security Mode Control and the Tracking Area Update (TAU) procedures are completed in messages 705-708.

During Idle mode mobility from UTRAN to eUTRAN, parameters for deciphering messages are found in the following messages. TAU Request message 701 can include also the old P-TMSI signature, old GUTI, KSI$_{SGSN}$, UE Network Capability, and NONCE$_{UE}$. GTPv2-C Context Request message 702 includes also the old P-TMSI signature, P-TMSI, and RAI. GTPv2-C Context Response message 703 includes CK, IK, and KSI. NAS Security Mode Command message 704 includes KSI, security capabilities, replayed NONCE$_{UE}$ and NONCE$_{MME}$.

The NONCEs and the CK, IK parameters are needed to calculate the new key K'$_{ASME}$. In the idle mode mobility scenario, the S value to use for K'$_{ASME}$ calculation is shown in Equation 3.

$$S=FC\|P0\|L0\|P1\|L1 \qquad \text{Eq. 3}$$

where:
FC=0x19;
P0=NONCE$_{UE}$;
L0=length of the NONCE$_{UE}$ parameter in two octets coding=0x00 0x04
P1=NONCE$_{MME}$;
L1=length of the NONCE$_{MME}$ parameter in two octets coding=0x00 0x04; and
∥=bit concatenation operator.

The NAS Tracking Area Request message 701, the NAS Security Mode Command message 704 and the GTPv2-C Context Response carry the information needed to generate K'$_{ASME}$ for Idle mode mobility.

The monitoring system captures and identifies data for the mapped security context in order to monitor and support the interface between the MME and the UTRAN/GERAN SGSN.

Many modifications and other embodiments of the invention will come to mind to one skilled in the art to which this invention pertains having the benefit of the teachings presented in the foregoing descriptions, and the associated drawings. Therefore, it is to be understood that the invention is not to be limited to the specific embodiments disclosed. Although specific terms are employed herein, they are used in a generic and descriptive sense only and not for purposes of limitation.

What is claimed is:

1. A method for deciphering data in an LTE network, comprising:
capturing, by a microprocessor, authentication response messages at a monitoring system coupled to an S6a interface;
identifying security keys (K$_{ASME}$) within the authentication info response messages; generating a calculated eNodeB key (K$^{alg}_{eNB}$) from each of the security keys;
storing each calculated eNodeB key and a related security key in a memory at the monitoring system;
capturing a context request message from an S1-MME interface, the context request message related to a particular user equipment context;
identifying an assigned eNodeB key (K$_{eNB-assign}$) within the context request message;
comparing the assigned eNodeB key to the calculated eNodeB keys that are stored in the memory;
identifying a matching calculated eNodeB key that corresponds to the assigned eNodeB key; and
using a security key associated with the matching calculated eNodeB to decipher message traffic from the context.

2. The method of claim 1, further comprising:
capturing CK and IK subkeys and KSI from an S3 interface.

3. The method of claim 1, further comprising:
extracting an algorithm type and a security key index from an S1AP HO Request or an S1AP TAU Request.

4. The method of claim 1, further comprising:
deriving a K'$_{ASME}$ value from CK and IK subkeys and one or two nonces as inputs;
creating an authentication vector table; and
appending an algorithm type and a security key index to the authentication vector table.

5. The method of 1, further comprising:
deriving an NAS deciphering key ($L_{NASenc}$) from the security key associated with the matching calculated eNodeB.

6. The method of 1, wherein the context request message is an S1AP Initial Context Setup Request message.

7. The method of 1, wherein the context request message is an S1AP UE Context Modification Request message.

8. The method of 1, further comprising:
capturing security mode complete messages from an S1-MME interface;
identifying an uplink count parameter within each of the security mode complete messages; and
generating the calculated eNodeB keys ($K^{alg}_{eNB}$) from the security keys and corresponding uplink count parameters.

* * * * *